United States Patent
Crowley

(10) Patent No.: US 7,084,593 B2
(45) Date of Patent: Aug. 1, 2006

(54) METHOD AND APPARATUS FOR THERMAL MANAGEMENT OF AN ELECTRIC POWER ASSIST STEERING CONTROL SYSTEM BY COMPENSATING STEERING MOTOR CURRENT

(75) Inventor: Colin Michael Crowley, Belleville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 90 days.

(21) Appl. No.: 10/119,888

(22) Filed: Apr. 10, 2002

(65) Prior Publication Data

US 2003/0193305 A1    Oct. 16, 2003

(51) Int. Cl.
  *H02P 7/00*    (2006.01)
  *G05B 23/00*   (2006.01)
  *B62D 6/00*    (2006.01)
  *B62D 5/04*    (2006.01)

(52) U.S. Cl. .................. 318/432; 318/434; 318/471; 318/472; 318/473; 318/433; 701/41; 180/443; 180/446

(58) Field of Classification Search .......... 318/432, 318/434, 471–473, 433, 634, 480; 701/41, 701/42; 180/443, 446; 388/934
  See application file for complete search history.

(56) References Cited

U.S. PATENT DOCUMENTS

| | | | |
|---|---|---|---|
| 4,611,682 A | * | 9/1986 | Yasuda et al. ............... 180/446 |
| 4,771,843 A | * | 9/1988 | Shimizu .................... 180/446 |
| 4,789,040 A | * | 12/1988 | Morishita et al. ........... 180/446 |
| 4,957,181 A | * | 9/1990 | Oshita et al. ............... 180/446 |
| 5,070,746 A |   | 12/1991 | Milunas et al. |
| 5,086,862 A |   | 2/1992 | Graber et al. |
| 5,341,077 A | * | 8/1994 | Chen et al. ................. 318/434 |
| 5,475,289 A |   | 12/1995 | McLaughlin et al. |
| 5,475,590 A |   | 12/1995 | Palansky et al. |
| 5,525,881 A | * | 6/1996 | Desrus ....................... 318/471 |
| 5,556,349 A |   | 9/1996 | Ishii et al. |
| 5,704,446 A |   | 1/1998 | Chandey et al. |
| 5,743,351 A |   | 4/1998 | McLaughlin |
| 5,857,162 A |   | 1/1999 | Vukovich et al. |
| 5,967,253 A | * | 10/1999 | Collier-Hallman .......... 180/421 |
| 5,999,869 A |   | 12/1999 | Nishimoto et al. |
| 6,031,965 A |   | 2/2000 | Hammer et al. |
| 6,046,560 A |   | 4/2000 | Lu et al. |

(Continued)

FOREIGN PATENT DOCUMENTS

| | | |
|---|---|---|
| EP | 0358111 A1 | 3/1990 |
| EP | 1057715 A2 | 6/2000 |
| JP | 080133107 A | 5/1996 |

*Primary Examiner*—Marlon T. Fletcher
*Assistant Examiner*—Patrick Miller
(74) *Attorney, Agent, or Firm*—Brinks Hofer Gilson & Lione

(57) ABSTRACT

An electric power assist steering control system having an electric motor actuator and a motor driver circuit for generating and applying a motor current to the electric motor actuator. A current sensor is included for measuring the motor current from the motor driver circuit and generating a feedback signal. A torque sensor is included for sensing an applied steering torque and providing a torque command signal having a value indicative of the applied steering torque. A controller calculates a temperature of the electric temperature of the electric motor actuator by evaluating the motor current applied to the electric motor actuator. In the case that the calculated temperature of the electric motor actuator surpasses a predetermined temperature, the electric power assist steering control system reduces the amount of motor current applied to the electric motor actuator thereby reducing the temperature of the electric motor actuator.

17 Claims, 2 Drawing Sheets

U.S. PATENT DOCUMENTS

| | | |
|---|---|---|
| 6,079,204 A | 6/2000 | Sun et al. |
| 6,092,618 A | 7/2000 | Collier-Hallman |
| 6,122,579 A | 9/2000 | Collier-Hallman et al. |
| 6,266,591 B1 | 7/2001 | Wilson-Jones et al. |
| 6,326,753 B1 * | 12/2001 | Someya et al. ............. 318/471 |
| 6,334,503 B1 * | 1/2002 | Fukumura et al. .......... 180/446 |
| 6,380,706 B1 * | 4/2002 | Kifuku et al. ............... 318/434 |
| 6,392,376 B1 * | 5/2002 | Kobayashi et al. ......... 318/471 |
| 6,549,871 B1 * | 4/2003 | Mir et al. .................... 702/145 |
| 6,690,138 B1 * | 2/2004 | Kaji et al. ................... 318/783 |
| 6,861,820 B1 * | 3/2005 | Gale et al. ................... 318/727 |
| 2003/0076064 A1 * | 4/2003 | Kleinau et al. .............. 318/567 |
| 2003/0076065 A1 * | 4/2003 | Shafer et al. ................ 318/567 |

* cited by examiner

METHOD AND APPARATUS FOR THERMAL MANAGEMENT OF AN ELECTRIC POWER ASSIST STEERING CONTROL SYSTEM BY COMPENSATING STEERING MOTOR CURRENT

FIELD OF THE INVENTION

The present invention relates generally to a vehicle steering system, and more particularly to a control strategy for an electric power assist steering control system.

BACKGROUND OF THE INVENTION

In the case of an electrical power assist steering system (referred to as EPAS), an electric motor actuator is provided for generating torque and applying the generated torque to a rack or linear steering member for steering of a vehicle. In the EPAS system, there is a mechanical connection between the steering wheel and the electric motor actuator wherein the torque generated by the electric motor actuator assist a driver's applied torque.

One concern with the electric motor actuator used to provide steering assist is the occurrence of electric motor actuator overheating. This is most likely to occur when the driver is engaged in a number of turns in high ambient temperatures or when the vehicle is powered-up, not in motion, and with the steering wheel held off center. To reduce the likelihood of overheating, designers have incorporated temperature measurement devices, such as a temperature sensor, which monitors the temperature of the control electronics of the electric motor actuator, or directly monitor the temperature of the electric motor actuator. The temperature sensor generates a signal indicative of the measured temperature which is utilized by a control algorithm to reduce the current applied to the electric motor actuator. A reduction in applied current thereby reduces the performance or level of assist steering torque, that in turn reduces the electric motor actuator temperature. The control algorithm will continue to reduce the applied current until the measured temperature falls within an acceptable temperature range.

However, in the above-mentioned prior art steering systems, the use of a temperature sensor increases the cost of the steering system, requires additional packaging considerations, and imposes a reliability factor. There is therefore a need for a steering system without a temperature sensor that will monitor the temperature of the electric motor actuator and consequently reduce the level of torque assist provided by the electric motor actuator when an unacceptable temperature condition is occurring.

SUMMARY OF THE INVENTION

The present invention is directed to a method and apparatus for controlling an electric power assist steering system by reducing the level of applied current to an electric motor actuator when a control algorithm determines an overheating condition for the electric motor actuator exists.

In accordance with a preferred embodiment of the present invention, an apparatus is provided for controlling an electric power assist steering system. The steering system includes an electric motor actuator, a current sensor, a torque sensor, a controller, and a motor driver circuit for generating and applying an electric current, referred to as motor current, to the electric motor actuator. The current sensor is included for measuring the electric current from the motor driver circuit and generating a feedback signal. The torque sensor is included for sensing a driver's applied steering torque and providing a torque command signal having a value indicative of the applied steering torque. The steering system includes the controller for calculating a temperature of the electric motor actuator by evaluating the motor current applied to the electric motor actuator and generating a temperature signal, and having a temperature reduction factor which correlates to the temperature signal for reducing the amount of motor current applied to the electric motor actuator when an overheating condition exists. When an overheating condition exists, the controller generates a control signal which is indicative of the overheating condition and applies the control signal to the motor driver circuit based on the torque command signal, a road wheel angle signal, and a feedback current signal. Consequently, the motor driver circuit produces a motor current which is reduced by the temperature reduction factor when the overheating condition is determined.

In accordance with a preferred embodiment of the present invention, a method for controlling an electrical power assist steering system that provides steering assist to a driver's applied steering is provided. The method includes the steps of generating a torque command signal based on diver input and determining the motor current applied to a electric motor actuator based on the torque command signal. The method further comprises the step of determining a temperature of the electric motor actuator based on the motor current applied to the electric motor actuator. An additional step of the method is determining whether or not the temperature of the electric motor actuator has exceeded a predetermined temperature limit. When the temperature of the electric motor actuator has exceeded the predetermined temperature limit, the method reduces the motor current applied to the electric motor actuator by a temperature reduction factor. The motor current is reduced until the temperature of the electric motor actuator falls within a predetermined temperature range.

These and other advantages, features and objects of the invention will become apparent from the drawings, detailed description and claims which follow.

DESCRIPTION OF THE PREFERRED EMBODIMENT(S)

Figure 1:
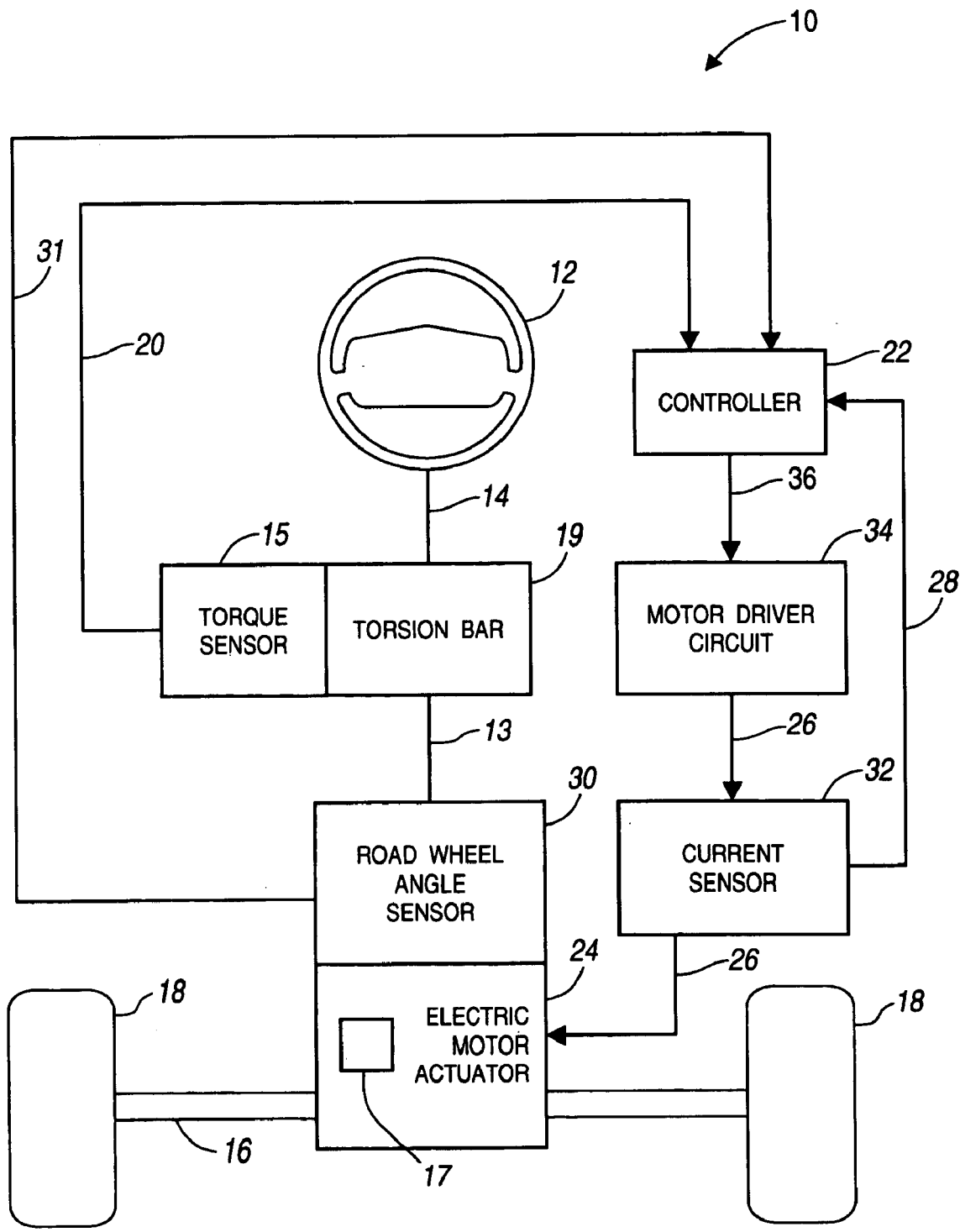
FIG. 1 is a schematic illustration of a steering control system for a vehicle according to the present invention.

Referring to FIG. 1, a steering control system 10 for a vehicle according to the present invention includes a steering wheel 12 connected to an input shaft 14. The input shaft 14 is operatively coupled to an output shaft 13 through a torsion bar 19. The torsion bar 19 twists in response to a driver's applied steering torque thereby permitting limited relative rotation between the input shaft 14 and output shaft 13 in a manner well known in the art.

A pinion gear 17 has gear teeth (not shown) that are meshingly engaged with gear teeth (not shown) on a linear steering member or rack 16. The rack 16 is coupled to a vehicle's road wheels 18 through a steering linkage in a known manner. The pinion gear 17 together with the rack 16 forms a rack and pinion gear set. The rotation of the pinion gear 17 is translated into lateral movement of the rack 16 causing steering angle changes for road wheels 18.

When the steering wheel 12 is turned, a torque sensor 15 senses a driver's applied torque to the input shaft 14 and torsion bar 19, and generates a driver torque command signal 20 which is applied to a controller 22. Concurrently with the turning of the steering wheel 12, an electric motor actuator 24 is energized and an output gear (not shown) of the electric motor actuator 24 begins to rotate. The angle and number of rotations of the electric motor actuator 24 corresponds directly with a turning angle of the road wheels 18. A road wheel angle sensor 30 is mechanically coupled to the electric motor actuator 24 and generates an output related to the turning angle of the road wheels 18. In the preferred embodiment, the road wheel angle sensor 30 is either a digital or analog encoder. In the case of the digital encoder, the electric motor actuator 24 generates electrical pulses which are applied to the digital encoder. In the case of the analog encoder, the electric motor actuator 24 generates an analog signal which is applied to the analog encoder.

A controller 22 generates a control signal 36 based on inputs from the torque sensor 15, the road wheel angle sensor 30, and a current sensor 32. The controller 22 applies the control signal 36 to a motor driver circuit 34 wherein the motor driver circuit 34 generates a motor current 26 for the electric motor actuator 24. As the motor current 26 is generated and applied to the electric motor actuator 24, the current sensor 32 senses the generated motor current 26 and applies a feedback current signal 28 to the controller 22. The feedback current signal 28 is one and the same with the motor current 26. Simultaneously, the rack and pinion gear set converts the rotary motion of the steering wheel 12 into linear motion of the rack 16. When the rack 16 moves linearly, the road wheels 18 pivot about their associated steering axes and the vehicle is steered. The electric motor actuator 24 is connected with the rack 16 through a known manner. The electric motor actuator 24, when energized, provides torque to assist the vehicle operator in steering the vehicle.

Figure 2:
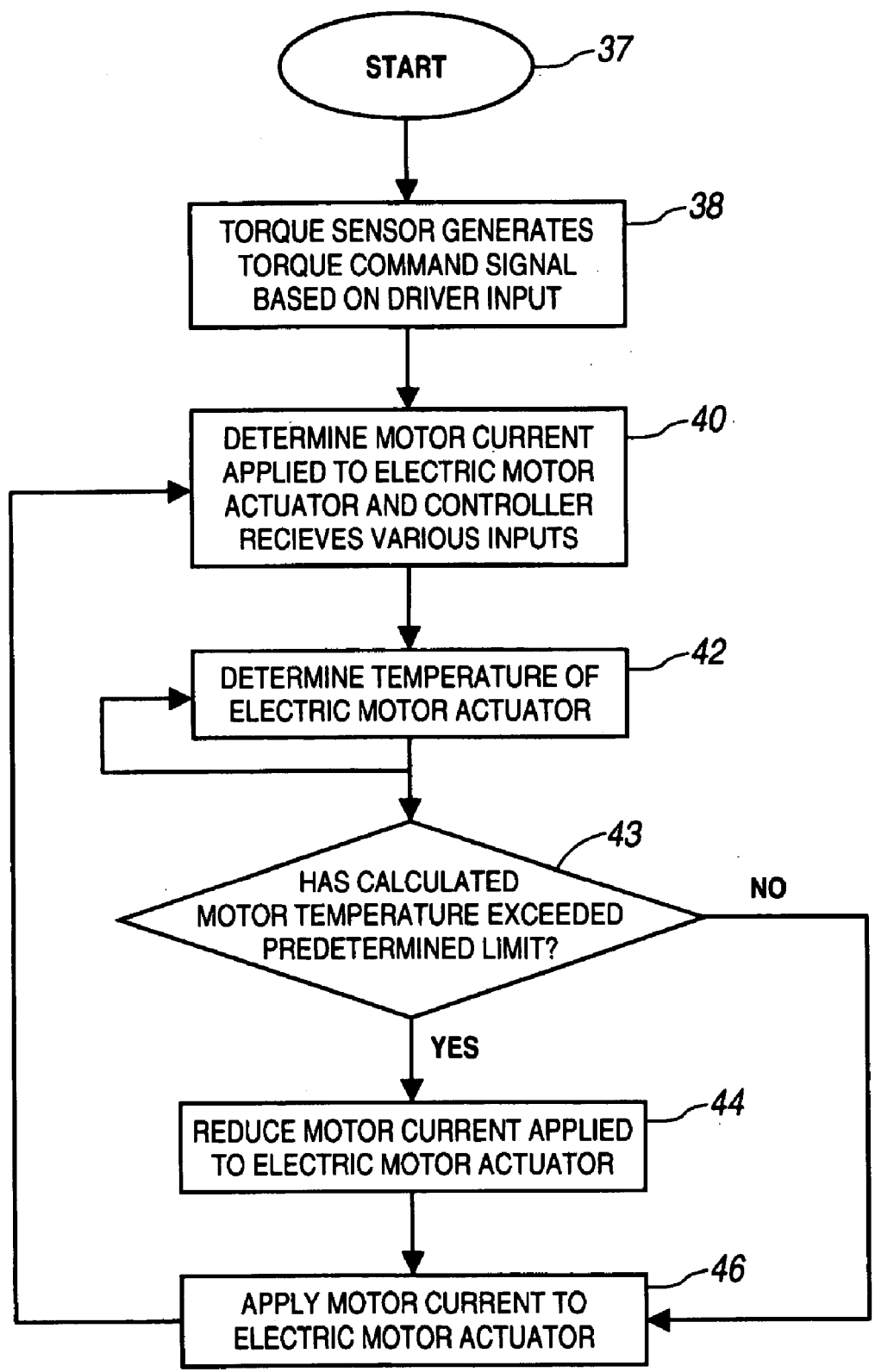
FIG. 2 is a flowchart of a compensation method performed by the steering control system according to this invention.

Referring to FIG. 2, the method begins at a step 37. At a step 38 the torque sensor 15 generates the torque command signal 20 based on the vehicle operator's input. At a step 40 the current sensor 32 determines the amount of motor current 26 applied to the electric motor actuator 24 based in part on the torque command signal 20 and provides a feedback current 28 to the controller 22. The torque sensor 15 applies the torque command signal 20 to the controller 22. At a step 42, the controller 22 determines a calculated temperature of the electric motor actuator 24.

In a preferred embodiment of the present invention, a motor temperature equation determines the calculated temperature and is programmed into non-volatile memory of the controller 22. A first step in determining the motor temperature equation is capturing the average kinetic energy of the steering control system 10. The average kinetic energy of the steering control system 10 can be expressed as follows:

$$MotorTemperature_n = MotorTemperature_{n-1} + [ThermalEnergy_{In} - ThermalEnergy_{Out}]dt$$

where $MotorTemperature_n$ (referred to as $TM_n$) is the present calculated temperature of the electric motor actuator 24, $MotorTemperature_{n-1}$ (referred to as $TM_{n-1}$) is a previously calculated temperature of the electric motor actuator 24, $ThermalEnergy_{In}$ is an amount of thermal energy entering the steering control system 10, and $ThermalEnergy_{Out}$ is an amount of thermal energy released from the steering control system 10. The difference between $ThermalEnergy_{In}$ and $ThermalEnergy_{Out}$ represents energy losses in the electric motor actuator 24 which are released as heat. The amount of thermal energy entering the steering control system 10 is proportional to the square of the motor current 26. For purposes of illustration, the motor current 26 is simply referred to as Iq.

Substituting the square of the motor current 26, the calculated motor temperature equation may be expressed as follows:

$$TM_n = TM_{n-1} + [k*Iq^2 - ThermalEnergy_{Out}]dt$$

where k is a proportionality constant.

The amount of thermal energy released from the steering control system 10 will be loss to the environment in the form of heat. A dominant form of heat transfer in this case will be convection; the conductive and radiative components of the heat transfer will be insignificant in value and will therefore be ignored for simplicity. In addition, as the motor temperature equation will estimate a worst-case condition of the electric motor actuator 24, it is assumed to be free convection, which has a lower heat transfer rate than forced convection. If there is a significant airflow over the motor, the actual motor temperature will be lower than the calculated motor temperature.

For purposes of simplicity, the motor temperature equation may assume infinite conduction within the electric motor actuator 24. Therefore, a surface temperature of the electric motor actuator 24 is equal to the temperature throughout the electric motor actuator 24. The assumption of infinite conduction is practical in the preferred embodiment because the major components of the electric motor actuator 24; which are iron, aluminum, and copper, have a higher thermal conductivity than the heat transfer coefficient of quiescent air. Therefore, heat will be distributed through out the electric motor actuator 24 at a greater rate than heat is dissipated to the environment. The calculated motor temperature equation may then be expressed as follows:

$$TM_n = TM_{n-1} + [k*Iq^2 - hA(TM_{n-1} - FluidTemperature)]dt$$

where h is a free convection heat transfer coefficient of the electric motor actuator 24 in air, A is a surface area of the electric motor actuator 24, and FluidTemperature (referred to as TF) is an ambient temperature around the electric motor actuator 24.

The proportionality constant k, the free convection heat transfer coefficient h, and the surface area A must be determined in order to be incorporated in the present invention. The surface area of the electric motor actuator 24 is determined in a known manner wherein h and A are viewed as a single term for computational simplicity. By setting a sampling rate at one hertz, the dt term in the motor, temperature equation becomes unity. Therefore the calculated motor temperature equation can be expressed as follows:

$$TM_n = TM_{n-1} + [k*Iq^2 - hA(TM_{n-1} - TF)].$$

In a preferred embodiment, the motor current Iq, the temperature variables $TM_n$, the TF, and $TM_{n-1}$ are determined through a laboratory experiment. The laboratory experiment may include connecting several thermocouples to an energized electric motor actuator in order to determine the temperature variables $TM_n$ and $TM_{n-1}$, as well as measuring the motor current 26 by way of a current measurement device. The FluidTemperature TF is determined by an additional thermocouple which measures the room temperature of the laboratory. By rearranging the motor temperature equation to solve for the unknowns, the motor temperature equation may be expressed as:

$$k*Iq^2 - hA(TM_{n-1} - TF) = TM_n - TM_{n-1}$$

or in matrix form:

$$|Iq^2(TM_n - TM_{n-1})| \times |\ k\ | = |(TM_{n-1} - TF)|$$
$$|-hA|$$

where $Iq^2$, $TM_{n-1}$, $TM_n$, and TF are all known. In a laboratory experiment of n data points, the motor temperature equation may take a form equivalent to a matrix equation:

$$[n \times 2] \times [2 \times 1] = [n \times 1].$$

Therefore, the motor temperature equation can be expressed as:

$$[n \times 1]/[n \times 2] = [1 \times 2].$$

The motor temperature equation as expressed above generates solutions for the proportionality constant k and the heat transfer coefficient h. The surface area A is determined in a known manner as previously mentioned. As a result of determining the values for the proportionality constant k, the heat transfer coefficient h, and the surface area A, the motor temperature equation, also referred to as a temperature model, can be programmed into the controller 22 wherein the controller 22 determines a calculated temperature of the electric motor actuator 24 at the step 42. During operation of the present invention, the controller 22 also generates a feed back signal which is recognized as $TM_{n-1}$ at the step 42.

At a step 43, the controller 22 determines whether or not the calculated motor temperature has exceeded a predetermined temperature limit. In the preferred embodiment the predetermined temperature limit is 110° C. (230° F.). In the case where the calculated motor temperature has exceeded the predetermined temperature limit, a step 44 occurs. At the step 44 the controller 22 will apply a signal which has a value indicative of the calculated motor temperature into a look-up table. The look-up table subsequently generates a number between zero and one, known as a temperature reduction factor, which is based on the calculated motor temperature. The temperature reduction factor is multiplied by the motor current 26, thereby reducing the amount of the feedback current signal 28. The reduced amount of the feedback current 28 is applied to the controller 22. At a step 46, the controller 22 generates the control signal 36 which is indicative of the determined overheating condition and applies the control signal 36 to the motor driver circuit 34. The motor driver circuit 34 consequently produces a reduced motor current 26 which is applied to the electric motor actuator 24. The reduction in the applied motor current 26 decreases the amount of energy added to the steering control system 10, thereby allowing a decrease in the temperature of the electric motor actuator 24 as energy in the form of heat is lost to the environment. Consequently, the level of assist provided by the electric motor actuator 24 is reduced. In the case where the calculated motor temperature has not exceeded the predetermined temperature limit, the step 46 occurs wherein the controller generates the control signal 36 and applies the control signal 36 to the motor driver circuit 34. The method then loops back to step 40.

Various other modifications to the present invention may occur to those skilled in the art to which the present invention pertains. The present invention may be used with equal utility in other embodiments and is not limited to those embodiments disclosed, and variations and modifications may be made without departing from the scope of the present invention.

What is claimed is:

1. A vehicle steering system including an electric motor actuator, a motor driver circuit for generating and applying a motor current to the electric motor actuator, a current sensor for measuring the motor current from the motor driver circuit and generating a feedback signal, a torque sensor for sensing an applied steering torque and providing a torque command signal having a value indicative of the applied steering torque, said steering system comprising:

a controller for calculating a temperature of the electric motor actuator by evaluating the motor current applied to the electric motor actuator and an amount of thermal energy released by the electric motor actuator, and generating a temperature signal and having a temperature reduction factor which correlates to the temperature signal for reducing the motor current and the controller for providing a control signal to the motor driver circuit based on the feedback current signal and the torque command signal wherein the motor current is reduced by the temperature reduction factor when the temperature of the electric motor actuator is determined by the controller to be greater than a predetermined temperature limit; and wherein the controller is programmed with an electric motor actuator temperature model for determining the temperature of the electric motor actuator.

2. A steering system according to claim 1, wherein the controller has a look-up table programmed into non-volatile memory.

3. A steering system according to claim 1, wherein the temperature reduction factor is variable.

4. A steering system according to claim 1, wherein the temperature model is $$TM_n = TM_{n-1} + [k*Iq^2 - hA(TM_{n-1} - TF)]$$

where $TM_n$ is the present calculated temperature of the electric motor actuator, $TM_{n-1}$ is a previously calculated temperature of the e ectric motor actuator, k is a proportionality constant, Iq is the motor current, h is a free convection seat transfer coefficient of the electric motor actuator in the air, A is a surface area of the electric motor actuator, and TF is an ambient temperature around the electrical motor actuator.

5. The system according to claim 1, wherein the temperature is calculated based on the relationship $$TM_n = TM_{n-1} + [k*Iq^2 - \text{Thermal Energy out}]dt$$

where $TM_n$ is the present calculated temperature of the e ectric motor actuator, $TM_{n-1}$ is a previously calculated temperature of the electric motor actuator, k is a proportionality constant, Iq is the motor current, and thermal energy$_{out}$ is an amount of thermal energy released from the steering control system.

6. The system according to claim 1, wherein the amount of energy released is calculated based on a free convection heat transfer coefficient of the electric motor actuator.

7. The system according to claim 1, wherein the amount of energy released is calculated based on a surface area of the electric motor actuator.

8. The system according to claim 1, wherein the temperature is calculated based on the relationship $$TM_n = TM_{n-1} + [k*Iq^2 - hA(TM_{n-1} - TF)]dt$$

where $TM_n$ is the present calculated temperature of the electric motor actuator, $TM_{n-1}$ is a previously calculated temperature of the electric motor actuator, k is a proportionality constant, Iq is the motor current, h is a free convection seat transfer coefficient of the electric motor actuator in the air, A is a surface area of the electric motor actuator, and TF is an ambient temperature around the electrical motor actuator.

9. A method for compensation of a motor current in a vehicle steering control system including an electric motor actuator, a motor driver circuit for generating and applying the motor current to the electric motor actuator, said method comprising the steps of:
   determining the motor current applied to the electric motor actuator;
   calculating a temperature of the electric motor actuator based on at least one electric motor actuator variable and an amount of thermal energy released by the electric motor actuator using a controller programmed with an electric motor actuator temperature model for determining the temperature of the electric motor actuator;
   reducing the motor current applied to the electric motor actuator based on the calculated temperature of the electric motor actuator until the calculated temperature of the electric motor actuator falls within a predetermined temperature range; and wherein the motor current applied to the electric motor actuator is reduced by a temperature reduction factor.

10. A method according to claim 9, wherein the motor current is determined by a current sensor.

11. A method according to claim 9, wherein the electric motor actuator variable is the motor current.

12. A method according to claim 9, wherein the motor current applied to the electric motor actuator is reduced when the temperature of the electric motor actuator is at least 110° C. (230° F.).

13. The method according to claim 9, wherein the temperature is calculated based on the relationship $$TM_n = TM_{n-1} + [k*Iq^2 - \text{Thermal Energy out}]dt$$

where $TM_n$ is the present calculated temperature of the electric motor actuator, $TM_{n-1}$ is a previously calculated temperature of the electric motor actuator, k is a proportionality constant, Iq is the motor current, and thermal energy$_{out}$ is an amount of thermal energy released from the steering control system.

14. The method according to claim 9, wherein the amount of energy released is calculated based on a free convection heat transfer coefficient of the electric motor actuator.

15. The method according to clam 9, wherein the amount of energy released is calculated based on a surface area of the electric motor actuator.

16. The method according to claim 9, wherein the temperature is calculated based on the relationship $$TM_n = TM_{n-1} + [k*Iq^2 - hA(TM_{n-1} - TF)]dt$$

where $TM_n$ is the present calculated temperature of the electric motor actuator, $TM_{n-1}$ is a previously calculated temperature of the electric motor actuator, k is a proportionality constant, Iq is the motor current, h is a free convection seat transfer coefficient of the electric motor actuator in the air, A is a surface area of the electric motor actuator, and TF is an ambient temperature around the electrical motor actuator.

17. A method for compensation of a motor current in a vehicle steering control system including an electric motor actuator, a motor driver circuit for generating and applying the motor current to the e ectric motor actuator, said method comprising the steps of:
   determining the motor current applied to the electric motor actuator;
   calculating a determined temperature of the electric motor actuator based on at least one electric motor actuator variable and an amount of thermal energy released by the electric motor actuator using a controller programmed with an electric motor actuator temperature model for determining the temperature of the electric motor actuator; and
   reducing the motor current applied to the electric motor actuator by a temperature reduction factor which is based on the determined temperature of the electric motor actuator until the determined temperature of the electric motor actuator falls within a predetermined temperature range.

* * * * *

UNITED STATES PATENT AND TRADEMARK OFFICE
CERTIFICATE OF CORRECTION

| | |
|---|---|
| PATENT NO. | : 7,084,593 B2 |
| APPLICATION NO. | : 10/119888 |
| DATED | : August 1, 2006 |
| INVENTOR(S) | : Colin M. Crowley |

It is certified that error appears in the above-identified patent and that said Letters Patent is hereby corrected as shown below:

In the Claims

Column 6, in claim 4, line 6, before "motor actuator" delete " e ectric" and substitute --electric-- in its place.

Signed and Sealed this

Twenty-first Day of November, 2006

JON W. DUDAS
*Director of the United States Patent and Trademark Office*